United States Patent
Yin et al.

(10) Patent No.: US 9,288,179 B2
(45) Date of Patent: Mar. 15, 2016

(54) METHOD AND APPARATUS FOR ASSIGNING IP ADDRESS

(71) Applicant: HUAWEI TECHNOLOGIES CO., LTD., Shenzhen (CN)

(72) Inventors: Shuhui Yin, Shenzhen (CN); Yi Zhang, Madrid (ES); Zhenggang You, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 270 days.

(21) Appl. No.: 13/930,277

(22) Filed: Jun. 28, 2013

(65) Prior Publication Data

US 2013/0286985 A1     Oct. 31, 2013

Related U.S. Application Data

(63) Continuation of application No. PCT/CN2011/083596, filed on Dec. 7, 2011.

(30) Foreign Application Priority Data

Dec. 30, 2010    (CN) .......................... 2010 1 0615976

(51) Int. Cl.
    *H04W 4/00*          (2009.01)
    *H04L 29/12*        (2006.01)
    (Continued)

(52) U.S. Cl.
    CPC ........ *H04L 61/2007* (2013.01); *H04L 61/2546* (2013.01); *H04L 61/2532* (2013.01); *H04L 61/2557* (2013.01); *H04W 76/022* (2013.01)

(58) Field of Classification Search
None
See application file for complete search history.

(56) References Cited

U.S. PATENT DOCUMENTS 6,636,491 B1 * 10/2003 Kari .................. H04L 29/12216
                                                    370/328
2007/0233311 A1    10/2007 Okada et al.
(Continued)

FOREIGN PATENT DOCUMENTS

| CN | 1360859 A | 7/2002 |
|---|---|---|
| CN | 1578487 A | 2/2005 |

(Continued)

OTHER PUBLICATIONS

International Search Report, dated Mar. 15, 2012, in corresponding International Application No. PCT/CN2011/083596 (4 pp.).

(Continued)

*Primary Examiner* — Candal Elpenord
(74) *Attorney, Agent, or Firm* — Staas & Halsey LLP

(57) ABSTRACT

Disclosed in embodiments of the present invention are a method and an apparatus for assigning an IP address, so as to simplify the process in which a GGSN assigns an IP address, and improve performance of the GGSN. The method in the embodiment of the present invention includes: receiving a request message initiated by the GGSN for creating a service PDP context for a user; obtaining a service list of the user; selecting a service with a different APN out of services recorded in the service; determining whether a same VPN exists in VPNs corresponding to the services with the different APN, and if not, sending a response message of creating a service PDP context for a user to the SGSN, and activating a service PDP context by using an IP address of a default PDP context as an IP address of the service PDP context.

9 Claims, 4 Drawing Sheets

(51) Int. Cl.
*H04W 72/04* (2009.01)
*H04W 76/02* (2009.01)

(56) References Cited

U.S. PATENT DOCUMENTS

| | | | |
|---|---|---|---|
| 2008/0130683 A1* | 6/2008 | Matsui | H04L 29/12594 370/475 |
| 2008/0235114 A1 | 9/2008 | Wannier et al. | |
| 2008/0274736 A1* | 11/2008 | Hu | H04W 8/12 455/433 |
| 2009/0213792 A1* | 8/2009 | Lee | H04L 29/12264 370/328 |
| 2010/0202351 A1* | 8/2010 | Xi | H04L 29/12188 370/328 |
| 2011/0134757 A1* | 6/2011 | Lin | H04W 72/085 370/241 |

FOREIGN PATENT DOCUMENTS

| | | |
|---|---|---|
| CN | 1752982 A | 3/2006 |
| CN | 1845513 A | 10/2006 |
| CN | 1859777 A | 11/2006 |
| CN | 1863127 A | 11/2006 |
| CN | 1863140 A | 11/2006 |
| CN | 1932827 A | 3/2007 |
| CN | 101183450 A | 5/2008 |
| CN | 101350759 A | 1/2009 |
| CN | 101425166 A | 5/2009 |
| CN | 101600224 A | 12/2009 |
| CN | 101819663 A | 9/2010 |
| CN | 101820392 A | 9/2010 |
| JP | 2002-58045 | 2/2002 |
| JP | 2005-248393 | 9/2005 |

OTHER PUBLICATIONS

PCT International Search Report and Written Opinion of the International Searching Authority mailed Sep. 8, 2011 in corresponding International Application No. PCT/CN2011/070448.

Chinese Office Action mailed Oct. 10, 2012 in corresponding Chinese Application No. 201010615976.1.

* cited by examiner

METHOD AND APPARATUS FOR ASSIGNING IP ADDRESS

CROSS-REFERENCE TO RELATED APPLICATIONS

This application is a continuation of International Application No. PCT/CN2011/083596, filed on Dec. 7, 2011, which claims priority to Chinese Patent Application No. 201010615976.1, filed on Dec. 30, 2010, both of which are hereby incorporated by reference in their entireties.

TECHNICAL FIELD

The present invention relates to the field of communications technologies, and in particular, to a method and an apparatus for assigning an Internet Protocol (IP, Internet Protocol) address.

BACKGROUND

To use a mobile phone to access a packet switched domain of the 3rd generation mobile telecommunications technology (3G, 3rd-generation) and a general packet radio service (GPRS, General Packet Radio Service) network through radio access technology, a user needs to configure an access point name (APN, Access Point Name) for the mobile phone first to initiate a packet data protocol (PDP, Packet Data Protocol) context activation process. According to APN information carried in an activation request message, a serving GPRS support node (SGSN, Serving GPRS Support Node) queries IP address information in a domain name system (DNS, Domain name system) server to determine which gateway GPRS support node (GGSN, Gateway GPRS Support Node) is creating a PDP context, thereby achieving access to different external packet data networks (PDN, Packet Data Network).

Currently, mobile operators have been establishing an increasing number of virtual private networks (VPN, Virtual Private Network). As regards one user, after obtaining a service list (service list) of the user, a GGSN may obtain an APN and a VPN that are associated with each service by querying the service list. As the mobile operators have been developing new diversified services, and each service is associated with an APN, the mobile operators need to create more APNs. For each new APN, it is required to update configuration parameters of a corresponding device in a system, such as: user subscription data in a home location register (HLR, Home Location Register), domain name system resolution configuration parameters in a DNS, and routing configuration information in a GGSN. This work undoubtedly aggravates the complexity and the cost of network management for the mobile operators. In addition, a user needs to change the APN configuration of the mobile phone if the user accesses different services, which increases operation complexity for the user.

To address the foregoing problems, a multiservice (Multi Service) APN solution based on content resolving is developed. A user may subscribe to several services (service), and allow a mobile operator to plan an APN for activating the service when the user accesses the network. A GGSN uses that APN to obtain subscription service information of the user. Therefore, the user may access various packet data networks by using the same APN.

In the prior art, a GGSN may obtain user subscription information in three modes: a remote authentication dial in user service (RADIUS, Remote Authentication Dial In User Service) mode, a policy and charging rules function (PCRF, Policy and Charging Rules Function) mode and a GGSN mode. In the three modes, the user subscription information is obtained in a similar way. The following takes the RADIUS mode as an example for description. The GGSN uses the APN contained in the activation request message (request APN) to perform authentication in an authentication, authorization and accounting (AAA, Authentication Authorization Accounting) server of a mobile operator and obtain subscription service information of the user. Then, the GGSN reassigns an IP address for a service PDP context by using different assignment methods based on different assignment manners of different IP addresses, and activates the service PDP context, so that the user may carry a data packet by using the assigned EP address to access a PDN network. However, in the prior art, when activating a service PDP context, the GGSN reassigns an IP address to the service PDP context by using different assignment methods based on different assignment manners of different IP addresses. Because there are many IP address assignment manners, IP address reassignment becomes complicated, and performance of a GGSN is affected. The IP address assignment manners include GGSN local assignment, AAA assignment, carrying a static address by a user, dynamic host configuration protocol (DHCP, Dynamic Host Configuration Protocol) assignment, and the like.

SUMMARY

Embodiments of the present invention provide a method and an apparatus for assigning an IP address, so as to simplify a process in which a GGSN assigns an IP address, and improve performance of the GGSN.

An embodiment of the present invention provides a method for assigning an IP address, where the method includes:

receiving a request message initiated by an SGSN for creating a service PDP context for a user;

obtaining a service list of the user; and selecting a service with a different APN out of services recorded in the service list, and determining whether a same VPN exists in VPNs corresponding to the services with the different APNs, and if not, sending a response message of creating a service PDP context for a user to the SGSN, and activating a service PDP context by using an IP address of a default PDP context as an IP address of the service PDP context.

An embodiment of the present invention provides an apparatus for assigning an IP address, where the apparatus includes:

a receiving unit, configured to receive a request message initiated by an SGSN for creating a service PDP context for a user;

an obtaining unit, configured to obtain a service list of the user;

a selecting unit, configured to select a service with a different APN out of services recorded in the service list;

a determining unit, configured to determine whether a same VPN exists in VPNs corresponding to the services with the different APNs;

a first sending unit, configured to send a response message of creating a service PDP context for a user to the SGSN when no same VPN exists in the VPNs corresponding to the services with the different APNs; and an activating unit, configured to activate a service PDP context by using an IP address of a default PDP context as an IP address of the service PDP context.

It can be seen from the technical solutions above that, the embodiments of the present invention have the following benefits:

In the embodiments of the present invention, a GGSN selects a service with a different APN out of services recorded in a service list, and determines whether a same VPN exists in VPNs corresponding to the services with the different APNs. When no same VPN exists in the VPNs corresponding to the services with the different APNs, the GGSN activates the service PDP context directly by using an IP address of a default PDP context as an IP address of the service PDP context. Because the IP address of the default PDP context is unique for a user, it is unnecessary for the GGSN to reassign an IP address by using different assignment methods based on different assignment manners of different IP addresses. Therefore, the process in which a GGSN assigns an IP address is simplified, and the performance of the GGSN is improved.

DESCRIPTION OF EMBODIMENTS

Embodiments of the present invention provide a method and an apparatus for assigning an IP address, so as to simplify a process in which a GGSN assigns an IP address, and improve performance of the GGSN.

Figure 1:
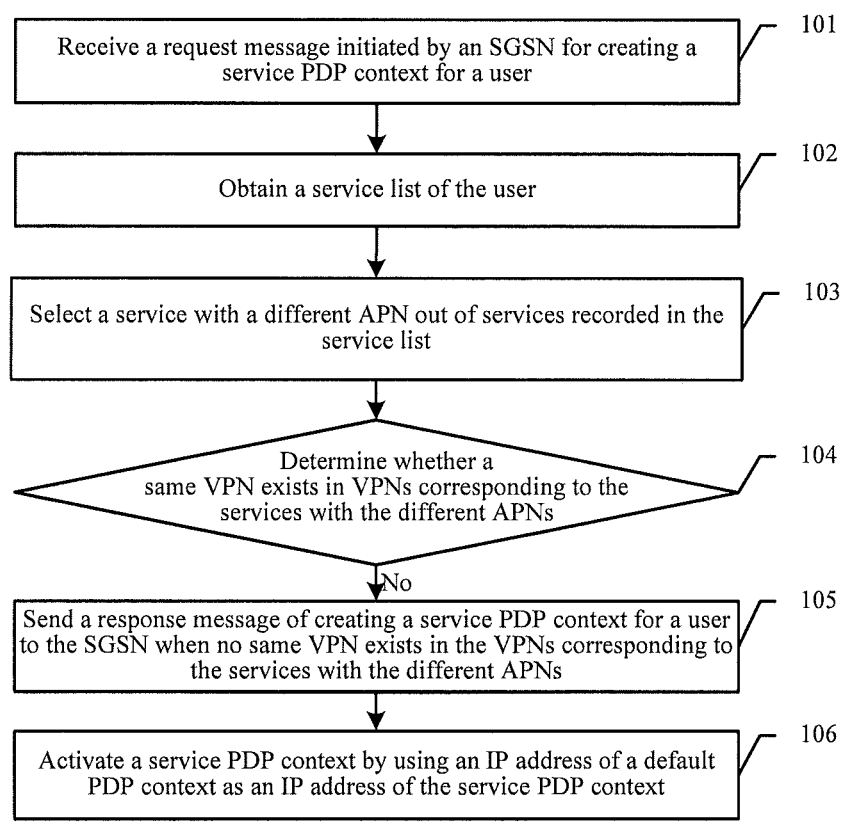
FIG. 1 is a schematic diagram of a method for assigning an IP address according to an embodiment of the present invention.

Referring to FIG. 1, a method for assigning an IP address in a detailed embodiment of the present invention includes:

Step 101: Receive a request message initiated by an SGSN for creating a service PDP context for a user.

In the embodiment of the present invention, an apparatus for assigning an IP address first receives the request message initiated by the SGSN for creating a service PDP context for a user. The SGSN is used to save location information of a routing area of the user, take charge of security and access control, send the request message for creating a service PDP context for a user to the apparatus for assigning an IP address in the embodiment of the present invention and update the service PDP context request message.

Step 102: Obtain a service list of the user.

After receiving the request message for creating a service PDP context for a user, the apparatus for assigning an IP address obtains the service list of the user that is the same for the same user and different for different users. The service list records names of all services that the user requests, and user names and passwords corresponding to all services. After obtaining the service list of the user, the apparatus for assigning an IP address is capable of obtaining APNs and VPNs corresponding to the services from the services recorded in the service list.

Step 103: Select a service with a different APN out of services recorded in the service list.

In a specific application, the apparatus for assigning an IP address selects the service with the different APN out of services recorded in the service list by traversing the service list of the user.

Step 104: Determine whether a same VPN exists in VPNs corresponding to the services with the different APNs.

After selecting the service with the different APN, the apparatus for assigning an IP address determines whether a same VPN exists in the VPNs corresponding to the services with the different APNs.

Step 105: Send a response message of creating a service PDP context for a user to the SGSN when no same VPN exists in the VPNs corresponding to the services with the different APNs.

When no same VPN exists in the VPNs corresponding to the services with the different APNs, the response message of creating a service PDP context for a user is sent to the SGSN. Because various resources such as an IP address, a routing entry, may be leaked or become inconsistent when the VPNs are the same, and properties related to the service PDP context may not be uniquely identified, in the embodiment of the present invention, a subsequent operation is performed only when no same VPN exists in the VPNs corresponding to the services with the different APNs. This avoids an abnormal risk such as resource leak or inconsistency. In this way, the properties of the service PDP context are capable of being uniquely identified.

Step 106: Activate a service PDP context by using an IP address of a default PDP context as an IP address of the service PDP context.

The apparatus for assigning an IP address activates the service PDP context by using the IP address of the default (default) PDP context as the IP address of the service PDP context. This avoids reassignment of an IP address by using different assignment methods based on different assignment manners of different IP addresses.

In the embodiment of the present invention, a service with a different APN is selected out of services recorded in a service list, and it is determined whether a same VPN exists in VPNs corresponding to the services with the different APNs. When no same VPN exists in the VPNs corresponding to the services with the different APNs, an apparatus for assigning an IP address activates the service PDP context directly by using the IP address of a default PDP context as the IP address of the service PDP context. Because the IP address of the default PDP context is unique for a user, it is unnecessary to reassign an IP address by using different assignment methods based on different assignment manners of different IP addresses. Therefore, the process in which a GGSN assigns an IP address is simplified, and the performance of the GGSN is improved.

Figure 2:
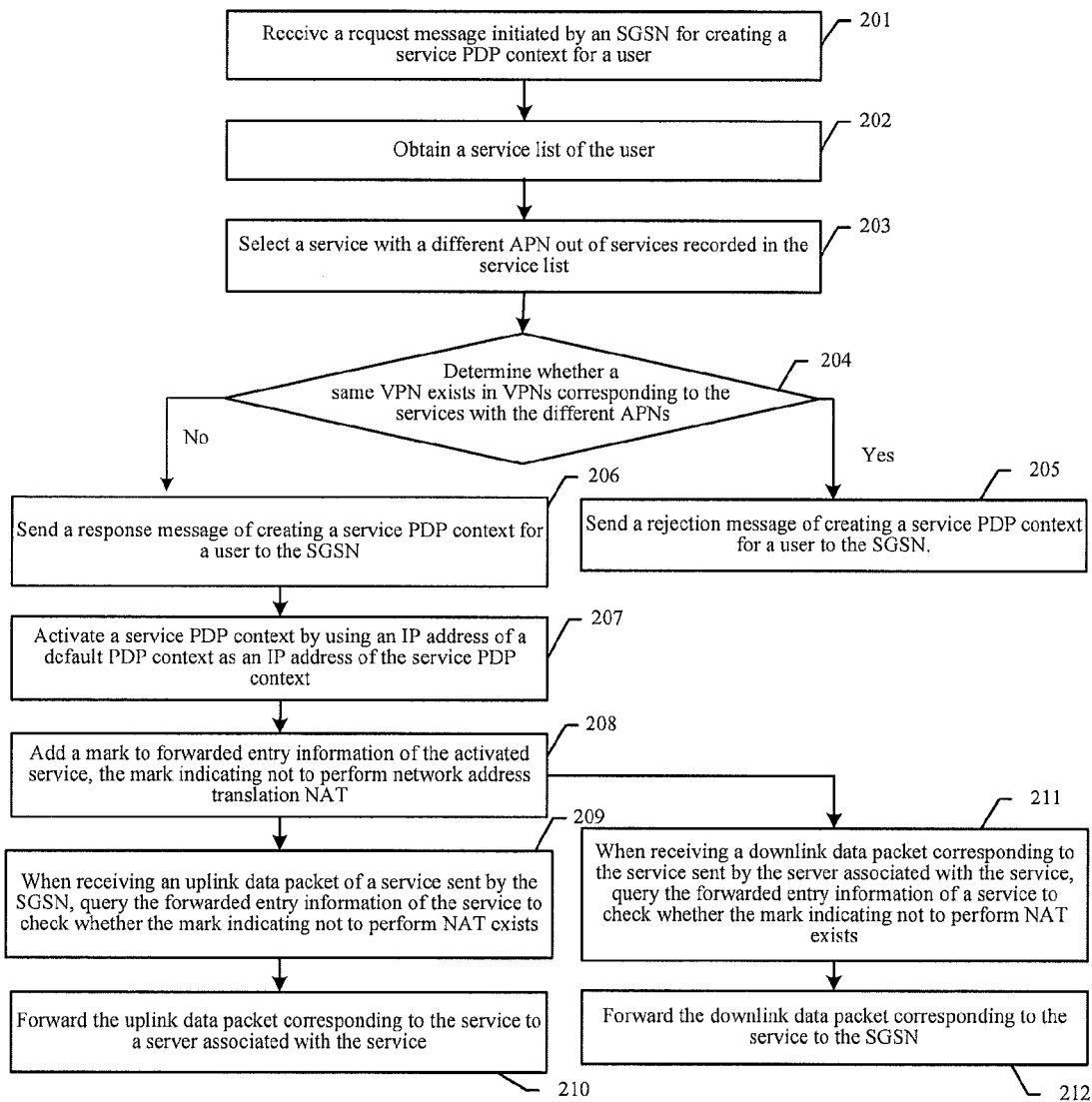
FIG. 2 is a schematic diagram of a method for assigning an IP address according to another embodiment of the present invention.

Further, referring to FIG. 2, a method for assigning an IP address in another detailed embodiment of the present invention includes:

Step 201: Receive a request message initiated by an SGSN for creating a service PDP context for a user.

In the embodiment of the present invention, an apparatus for assigning an IP address first receives a request message initiated by the SGSN for creating a service PDP context for a user sent. The message for creating a service PDP context carries an APN configured by the user.

Step 202: Obtain a service list of the user.

After receiving the request message initiated by the SGSN for creating a service PDP context for a user, the apparatus for assigning an IP address may determine the service list of which user is to be obtained and then obtains the service list of the user. The service list is the same for the same user and different for different users. The service list records names of all services that the user requests, and user names and passwords corresponding to the services. Specifically, the service list may be obtained from a corresponding network element according to different modes: in a RADIUS mode, it is obtained from an AAA server; in a PCRF mode, it is obtained from the PCRF; and in a local mode, it is obtained from local APN configuration in a GGSN. For details about the process, reference may be made to the prior art.

Step 203: Select a service with a different APN out of services recorded in the service list.

In a specific application, the apparatus for assigning an IP address selects the service with the different APN out of services recorded in the service list by traversing the service list of the user.

Step 204: Determine whether a same VPN exists in VPNs corresponding to the services with the different APNs.

After selecting the service with the different APN, the apparatus for assigning an IP address determines whether a same VPN exists in the VPNs corresponding to the services with the different APNs. If yes, perform step 205; if not, perform step 206 to step 212.

Step 205: Send a rejection message of creating a service PDP context for a user to the SGSN.

When a same VPN exists in the VPNs corresponding to the services with the different APNs, the rejection message of creating a service PDP context for a user is sent to the SGSN, that is, the network access of the user is rejected.

Step 206: Send a response message of creating a service PDP context for a user to the SGSN.

When no same VPN exists in the VPNs corresponding to the services with the different APNs, the response message of creating a service PDP context for a user is sent to the SGSN. Because various resources such as an IP address, a routing entry, may be leaked or become inconsistent when the VPNs are the same, and properties related to the service PDP context may not be uniquely identified, in the embodiment of the present invention, a subsequent operation is performed only when no same VPN exists in the VPNs corresponding to the services with the different APNs. This avoids an abnormal risk such as resource leak or inconsistency. In this way, the properties of the service PDP context are capable of being uniquely identified.

Step 207: Activate a service PDP context by using an IP address of a default PDP context as an IP address of the service PDP context.

The apparatus for assigning an IP address activates the service PDP context by using the IP address of the default PDP context as the IP address of the service PDP context. This avoids reassignment of an IP address by using different assignment methods based on different assignment manners of different IP addresses.

Step 208: Add a mark to forwarded entry information of the activated service, the mark indicating not to perform network address translation NAT.

After activating the service PDP context by using the IP address of the default PDP context as the IP address of the service PDP context, the apparatus for assigning an IP address marks, in the forwarded entry information of the activated service, that network address translation (NAT, Network Address Translation) is not performed.

Step 209: When receiving an uplink data packet corresponding to a service sent by the SGSN, query the forwarded entry information of the service to check whether the mark indicating not to perform NAT exists, and if yes, perform step 210.

Step 210: Forward the uplink data packet corresponding to the service to a server associated with the service.

Step 211: When receiving a downlink data packet corresponding to the service sent by the server associated with the service, query the forwarded entry information of a service to check whether the mark indicating not to perform NAT exists, and if yes, perform step 212.

Step 212: Forward the downlink data packet corresponding to the service to the SGSN.

In the embodiment of the present invention, a service with a different APN is selected out of services recorded in a service list, and it is determined whether a same VPN exists in VPNs corresponding to the services with the different APNs. When no same VPN exists in the VPNs corresponding to the services with the different APNs, an apparatus for assigning an IP address activates the service PDP context directly by using the IP address of a default PDP context as the IP address of the service PDP context. Because the IP address of the default PDP context is unique for a user, it is unnecessary to reassign an IP address by using different assignment methods based on different assignment manners of different IP addresses. Therefore, the process in which a GGSN assigns an IP address is simplified, and the performance of the GGSN is improved. In addition, because the service PDP context is activated by using the IP address of the default PDP context as the IP address of the service PDP context, when uplink and downlink data packets corresponding to a service need to be forwarded, they may be forwarded directly and network address translation does not need to be performed, if there is a mark indicating not to perform NAT exists in forwarded entry information of the service. This improves the performance of the GGSN.

Figure 3:
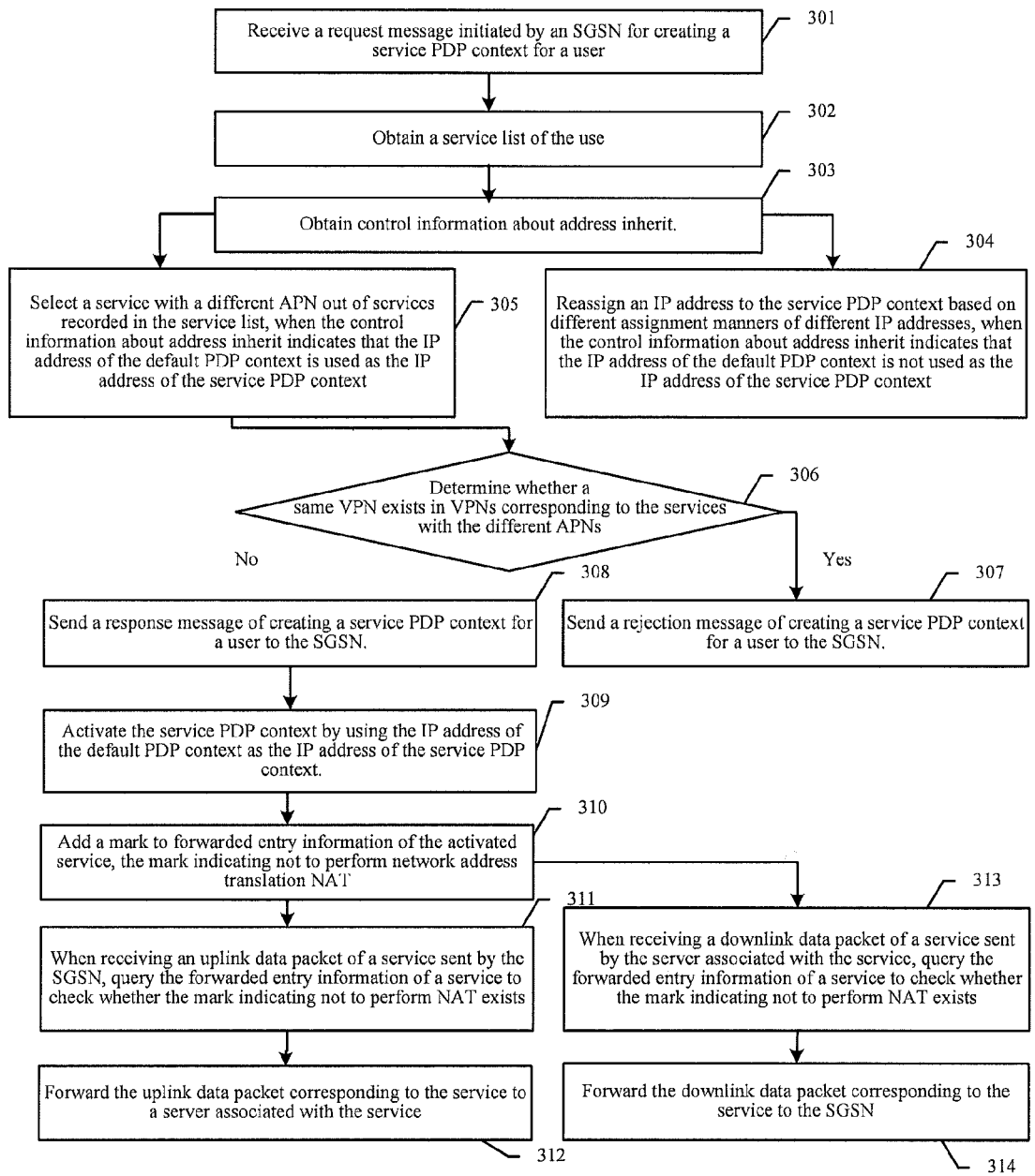
FIG. 3 is a schematic diagram of a method for assigning an IP address according to another embodiment of the present invention.

Referring to FIG. 3, a method for assigning an IP address in another detailed embodiment of the present invention includes:

Step 301: Receive a request message initiated by an SGSN for creating a service PDP context for a user.

In the embodiment of the present invention, step 301 is the same as step 101 in FIG. 1, which is not described herein again.

Step 302: Obtain a service list of the user.

An apparatus for assigning an IP address obtains the service list of the user. The service list of the user includes names of all services that the user requests, and user names and passwords corresponding to all the services.

Step 303: Obtain control information about address inherit.

The control information about address inherit is used for indicating whether to use an IP address of a default PDP context as an IP address of the service PDP context.

In a practical application, a field address inherit (address inherit) may be added for a APN in a GGSN, and may be configured with a switch which specifically may be enable and disable. The enable designates that the IP address of the default PDP context is used as the IP address of the service context; whereas, the disable designates that the IP address of the default PDP context is not used as the IP address of the service context. It should be noted that a combination of adding a field and configuring a switch in the embodiment of the present invention is merely an implementation manner. In a practical application, there are other implementations which are not limited herein.

If the control information about address inherit indicates that the IP address of the default PDP context is not used as the IP address of the service PDP context, step 304 is triggered; if the control information indicates that the IP address of the default PDP context is used as the IP address of the service PDP context, step 305 to step 314 are triggered.

Step 304: Reassign an IP address to the service PDP context based on different assignment manners of different EP addresses, when the control information about address inherit indicates that the IP address of the default PDP context is not used as the IP address of the service PDP context.

During specific implementation of the embodiment of the present invention, a mobile operator may set the switch of the control information about address inherit to disable, indicating that the IP address of the default PDP context is not used as the IP address of the service PDP context.

Step 305: Select a service with a different APN out of services recorded in the service list, when the control information about address inherit indicates that the IP address of the default PDP context is used as the IP address of the service PDP context.

During specific implementation of the embodiment of the present invention, a mobile operator may set the switch of the control information about address inherit to enable, indicating that the IP address of the default PDP context is used as the IP address of the service PDP context.

Step 306: Determine whether a same VPN exists in VPNs corresponding to the services with the different APNs.

After selecting the service with the different APN, the apparatus for assigning an IP address determines whether a same VPN exists in the VPNs corresponding to the services with the different APNs. If yes, perform step 307; if not, perform step 308 to step 314.

Step 307: Send a rejection message of creating a service PDP context for a user to the SGSN.

When a same VPN exists in the VPNs corresponding to the services with the different APNs, the rejection message of creating a service PDP context for a user is sent to the SGSN.

Step 308: Send a response message of creating a service PDP context for a user to the SGSN.

When no same VPN exists in the VPNs corresponding to the services with the different APNs, the response message of creating a service PDP context for a user is sent to the SGSN.

Step 309: Activate the service PDP context by using the IP address of the default PDP context as the IP address of the service PDP context.

After sending the response message of creating a service PDP context for a user to the SGSN, the apparatus for assigning an IP address activates the service PDP context by using the IP address of the default PDP context as the IP address of the service PDP context, instead of reassigning an IP address for the service PDP context by using different assignment methods in the prior art. This simplifies the process in which the GGSN assigns an IP address.

Step 310: Add a mark to forwarded entry information of the activated service, the mark indicating not to perform network address translation NAT.

Step 311: When receiving an uplink data packet corresponding to a service sent by the SGSN, query the forwarded entry information of a service to check whether the mark indicating not to perform NAT exists, and if yes, perform step 312.

Step 312: Forward the uplink data packet corresponding to the service to a server associated with the service.

Step 313: When receiving a downlink data packet of a service sent by the server associated with the service, query the forwarded entry information of a service to check whether the mark indicating not to perform NAT exists, and if yes, perform step 314.

Step 314: Forward the downlink data packet corresponding to the service to the SGSN.

In the embodiment of the present invention, when control information about address inherit indicates that the IP address of a default PDP context is used as the IP address of a service PDP context, after a service with a different APN is selected out of services recorded in a service list, it is determined whether a same VPN exists in VPNs corresponding to the services with the different APNs. The service PDP context is activated directly by using the IP address of the default PDP context as the IP address of the service PDP context when no same VPN exists in the VPNs corresponding to the services with different APNs. Because the IP address of the default PDP context is unique for a user, it is unnecessary to reassign an IP address by using different assignment methods based on different assignment manners of different IP addresses when the default PDP context is activated. Therefore, the process in which a GGSN assigns an IP address is simplified, and the performance of the GGSN is improved. In addition, because the service PDP context is activated by using the IP address of the default PDP context as the IP address of the service PDP context, a mark indicating not to perform NAT may be added to the forwarded entry information of the activated service. When uplink and downlink data packets corresponding to a service need to be forwarded, they may be forwarded directly and network address translation does not need to be performed, if the mark indicating not to perform NAT exists in forwarded entry information of the service. This improves the performance of the GGSN.

Figure 4:
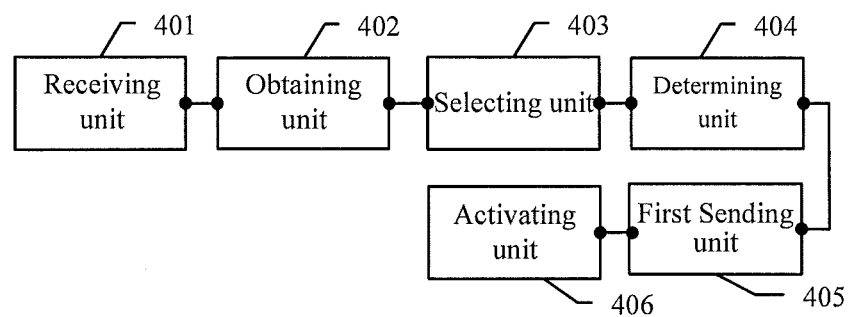
FIG. 4 is a schematic diagram of an apparatus for assigning an IP address according to an embodiment of the present invention.

The previous embodiments have introduced a method for assigning an IP address. The following will describe an apparatus for assigning an IP address. In a practical application, the apparatus for assigning an IP address may be a GGSN or a physical device of the GGSN, which is not limited herein. The following embodiments are apparatus embodiments corresponding to the previous method embodiments, and therefore no specific example is described, but the description in the previous embodiments may be regarded as a reference. The following will illustrate functions of each unit of the apparatus for assigning an IP address and an entire interaction process. Referring to FIG. 4, it shows an example of the apparatus for assigning an IP address in the embodiment of the present invention, including:

a receiving unit 401, configured to receive a request message initiated by an SGSN for creating a service PDP context for a user;

an obtaining unit 402, configured to obtain a service list of the user;

a selecting unit 403, configured to select a service with a different APN out of services recorded in the service list;

a determining unit 404, configured to determine whether a same VPN exists in VPNs corresponding to the services with the different APNs;

a first sending unit 405, configured to send a response message of creating a service PDP context for a user to the SGSN when no same VPN exists in the VPNs corresponding to the services with the different APNs; and an activating unit 406, configured to activate a service PDP context by using an IP address of a default PDP context as an IP address of the service PDP context.

The interaction process of the units is as follows:

after the receiving unit 401 receives a request message for creating a service PDP context for a user, the obtaining unit 402 may obtain the service list of the user, and then the selecting unit 403 selects a service with a different APN out of services recorded in the service list, and the determining unit 404 determines whether a same VPN exists in VPNs corresponding to the services with the different APNs, and when no same VPN exists in the VPNs corresponding to the services with the different APNs, the first sending unit 405 sends a response message of creating a service PDP context for a user to the SGSN, and finally, the activating unit 406 activates the service PDP context by using the IP address of a default PDP context as the IP address of the service PDP context.

In the embodiment of the present invention, the selecting unit 403 selects a service with a different APN out of services recorded in a service list; the determining unit 404 determines whether a same VPN exists in VPNs corresponding to the services with the different APNs; the activating unit 406 activates the service PDP context by using the IP address of a default PDP context as the IP address of the service PDP context when no same VPN exists in the VPNs corresponding to the services with the different APNs. Because the IP address of the default PDP context is unique for a user, it is unnecessary to reassign an IP address by using different assignment methods based on different assignment manners of different IP addresses. Therefore, the process in which a GGSN assigns an IP address is simplified, and the performance of the GGSN is improved.

Figure 5:
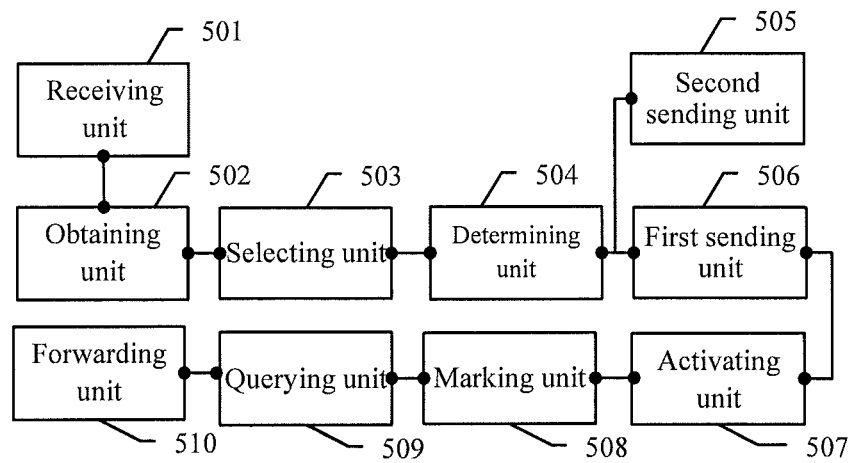
FIG. 5 is a schematic diagram of an apparatus for assigning an IP address according to another embodiment of the present invention.

Further, referring to FIG. 5, an apparatus for assigning an IP address in another detailed embodiment of the present invention includes:

a receiving unit 501, configured to receive a request message initiated by an SGSN for creating a service PDP context for a user;

an obtaining unit 502, configured to obtain a service list of the user;

a selecting unit 503, configured to select a service with a different APN out of services recorded in the service list;

a determining unit 504, configured to determine whether a same VPN exists in VPNs corresponding to the services with the different APNs;

a second sending unit 505, configured to send a rejection message of creating a service PDP context for a user to the SGSN when a same VPN exists in the VPNs corresponding to the services with the different APNs;

a first sending unit 506, configured to send a response message of creating a service PDP context for a user to the SGSN when no same VPN exists in the VPNs corresponding to the services with the different APNs;

an activating unit 507, configured to activate a service PDP context by using an IP address of a default PDP context as an IP address of the service PDP context;

a marking unit 508, configured to add a mark to forwarded entry information of the activated service, the mark indicating not to perform network address translation NAT;

a querying unit 509, configured to: when receiving an uplink data packet corresponding to the service sent by the SGSN, query the forwarded entry information of a service to check whether the mark indicating not to perform NAT exists in the forwarded entry information of the service; and a forwarding unit 510, configured to forward the uplink data packet corresponding to the service to a server associated with the service when the mark indicating not to perform NAT exists in the forwarded entry information of the service.

It should be noted that the querying unit 509 is further configured to: when receiving the downlink data packet corresponding to the service sent by the server associated with the service, query the forwarded entry information of the service to check whether the mark indicating not to perform NAT exists; and that the forwarding unit 510 is further configured to forward the downlink data packet corresponding to the service to the SGSN when the mark indicating not to perform NAT exists in the forwarded entry information of the service.

In the embodiment of the present invention, the selecting unit 503 selects a service with a different APN out of services recorded in a service list; the determining unit 504 determines whether a same VPN exists in VPNs corresponding to the services with the different APNs; the activating unit 507 activates the service PDP context by using the IP address of the default PDP context as the IP address of the service PDP context when no same VPN exists in the VPNs corresponding to the services with the different APNs. Because the IP address of the default PDP context is unique for a user, it is unnecessary to reassign an IP address by using different assignment methods based on different assignment manners of different IP addresses. Therefore, the process in which a GGSN assigns an IP address is simplified, and the performance of the GGSN is improved. In addition, because the service PDP context is activated by using the IP address of the default PDP context as the IP address of the service PDP context, a mark indicating not to perform NAT may be added to the forwarded entry information of the activated service. When uplink and downlink data packets corresponding to the service need to be forwarded, the forwarding unit 510 may directly forward the uplink and downlink data packets and Network Address Translation does not need to be performed, if the querying unit 509 finds that the mark indicating not to perform NAT exists in the forwarded entry information of the service after querying the forwarded entry information of the service. This improves the performance of the GGSN.

Further, refer to a next detailed example. In the embodiment shown in FIG. 5, an apparatus for assigning an IP address may include, in addition to the units shown in FIG. 5, the following units (not shown in FIG. 5):

an obtaining unit 502, configured to obtain control information about address inherit, where the control information about address inherit is used for indicating whether the IP address of a default PDP context is used as the IP address of a service PDP context to activate the service PDP context; and a triggering unit 511, configured to trigger the selecting unit 503 when the control information about address inherit indicates that the IP address of the default PDP context is used as the IP address of the service PDP context.

The embodiment of the present invention provides, in addition to the benefits provided by the embodiment in FIG. 5, the following benefit: the flexibility of the method for assigning an IP address is improved, because the obtaining unit 502 may receive the control information about address inherit, which allows a mobile operator to determine whether to use the IP address of the default PDP context as the IP address of the service PDP context.

Persons of ordinary skill in the art may understand that all or part of the steps of the methods in the foregoing embodiments may be implemented by a computer program instructing relevant hardware. The program may be stored in a computer readable storage medium. The storage medium may include a ROM, a RAM, a magnetic disk, or an optical disk, and the like.

A method and an apparatus for assigning an IP address that are provided in the embodiments of the present invention are introduced in detail in the foregoing. In this specification, specific examples are used for illustrating principles and implementation manners of the present invention. The foregoing descriptions of the embodiments are merely used to help understand the methods and core ideas of the present invention. Meanwhile, persons of ordinary skill in the art may make modifications to the specific implementation manners and application scopes according to the idea of the present invention. In conclusion, the content of this specification shall not be construed as a limitation to the present invention.

What is claimed is:

1. A method for assigning an Internet Protocol (IP) address, comprising:

receiving a request message initiated by a serving GPRS supporting node (SGSN) for creating a service packet data protocol (PDP) context for a user; obtaining a service list of the user; selecting a service with a different access point name (APN) out of services recorded in the service list, and determining whether a same virtual private network (VPN) exists in VPNs corresponding to the services with the different APNs, and if not, sending a response message of creating a service PDP context for a user to the SGSN, and activating a service PDP context by using an IP address of a default PDP context as an IP address of the service PDP context and determining whether to perform network address translation (NAT), and forwarding an uplink data packet corresponding to a service sent by the SGSN to a server associated with the service based on the determining and forwarding a downlink data packet corresponding to the service to the SGSN based on the determining.

2. A method for assigning an Internet Protocol IP address, comprising:

receiving a request message initiated by a serving GPRS supporting node (SGSN) for creating a service packet data protocol (PDP) context for a user; obtaining a service list of the user; and selecting a service with a different access point name APN out of services recorded in the service list, and determining whether a same VPN exists in VPNs corresponding to the services with the different APNs, and if not, sending a response message of creating a service PDP context for a user to the SGSN, and activating a service PDP context by using an IP address of a default PDP context as an IP address of the service PDP context, wherein after the activating a service PDP context by using an IP address of a default PDP context as an IP address of the service PDP context, comprising: adding a mark to forwarded entry information of the activated service, the mark indicating not to perform network address translation (NAT); when receiving an uplink data packet corresponding to a service sent by the SGSN, querying the forwarded entry information of a service to check whether the mark indicating not to perform NAT exists, and if yes, forwarding the uplink data packet corresponding to the service to a server associated with the service; and when receiving a downlink data packet corresponding to the service sent by the SGSN, querying the forwarded entry information of a service to check whether the mark indicating not to perform NAT exists, and if yes, forwarding the downlink data packet corresponding to the service to the SGSN.

3. The method for assigning the IP address according to claim 1, wherein a rejection message of creating a service PDP context for a user is sent to the SGSN if the same VPN exists in the VPNs corresponding to the services with the different APNs.

4. The method for assigning the IP address according to claim 1, after the obtaining a service list of the user, comprising: obtaining control information about address inherit, wherein the control information about address inherit indicates whether to use the IP address of the default PDP context as the IP address of the service PDP context; and triggering the step of selecting a service with a different APN out of services recorded in the service list, if the control information about address inherit indicates that the IP address of the default PDP context is used as the IP address of the service PDP context.

5. An apparatus for assigning an Internet Protocol (IP) address, comprising:

a receiving unit, configured to receive a request message initiated by a serving GPRS supporting node (SGSN) for creating a service packet data protocol (PDP) context for a user; an obtaining unit, configured to obtain a service list of the user; a selecting unit, configured to select a service with a different APN out of services recorded in the service list; a determining unit, configured to determine whether a same virtual private network (VPN) exists in VPNs corresponding to the services with the different APNs; a first sending unit, configured to send a response message of creating a service PDP context for a user to the SGSN when no same VPN exists in the VPNs corresponding to the services with the different APNs; an activating unit, configured to activate a service PDP context by using an IP address of a default PDP context as an IP address of the service PDP context; a querying unit, configured to: when receiving an uplink data packet corresponding to a service sent by the SGSN, querying whether to perform network address translation (NAT), and when receiving a downlink data packet corresponding to the service sent by the server associated with the service, querying whether to perform NAT; and a forwarding unit configured to: forward an uplink data packet corresponding to the service to a server associated with the service based on the querying, and forward the downlink data packet corresponding to the service to the SGSN based on the querying.

6. An apparatus for assigning an Internet Protocol (IP) address, comprising:

a receiving unit, configured to receive a request message initiated by a serving GPRS supporting node (SGSN) for creating a service packet data protocol (PDP) context for a user; an obtaining unit, configured to obtain a service list of the user; a selecting unit, configured to select a service with a different APN out of services recorded in the service list; a determining unit, configured to determine whether a same virtual private network (VPN) exists in VPNs corresponding to the services with the different APNs; a first sending unit, configured to send a response message of creating a service PDP context for a user to the SGSN when no same VPN exists in the VPNs corresponding to the services with the different APNs; an activating unit, configured to activate a service PDP context by using an IP address of a default PDP context as an IP address of the service PDP context; a marking unit, configured to add a mark to forwarded entry information of the activated service, the mark indicating not to perform network address translation (NAT); a querying unit, configured to: when receiving an uplink data packet corresponding to a service sent by the SGSN, query the forwarded entry information of a service to check whether the mark indicating not to perform NAT exists; and a forwarding unit, configured to forward the uplink data packet corresponding to the service to a server associated with the service when the mark indicating not to perform NAT exists in the forwarded entry information of the service; wherein the querying unit is further configured to: when receiving a downlink data packet corresponding to the service sent by the server associated with the service, query the forwarded entry information of a service to check whether the mark indicating not to perform NAT exists; and the forwarding unit is further configured to forward the downlink data packet corresponding to the service to the SGSN when the mark indicating not to perform NAT exists in the forwarded entry information of the service.

7. The apparatus for assigning the IP address according to claim 5, further comprising: a second sending unit, configured to send a rejection message of creating a service PDP context for a user to the SGSN when no same VPN exists in the VPNs corresponding to the services with the different APNs.

8. The apparatus for assigning the IP address according to claim 5, wherein the obtaining unit is further configured to obtain control information about address inherit, wherein the control information about address inherit indicates whether to use the IP address of the default PDP context as the IP address of a service PDP context; and the apparatus further comprises: a triggering unit, configured to trigger the selecting unit when the control information about address inherit indicates that the IP address of the default PDP context is used as the IP address of the service PDP context.

9. The apparatus for assigning the IP address according to claim 5, wherein the apparatus is a gateway GPRS support node (GGSN).

* * * * *